United States Patent Office 2,796,333
Patented June 18, 1957

2,796,333
TREATMENT OF PHOSPHORUS CONDENSER WATER

William W. Wade, Columbia, Tenn., assignor to Monsanto Chemical Company, St. Louis, Mo., a corporation of Delaware No Drawing. Application March 8, 1952, Serial No. 275,683

7 Claims. (Cl. 23—223)

This invention relates to the art of producing elemental phosphorus and particularly to the treatment of the water used to condense phosphorus from gases containing same.

Elemental phosphorus is produced in an electric or blast furnace by heating a mixture of phosphatic materials, a flux such as silica and a reducing agent. These methods of manufacture yield a hot gaseous mixture including phosphorus vapor, phosphorus oxides, silicon tetrafluoride, hydrogen fluoride, carbon monoxide and entrained solid particles from the furnace charge, and two solid by-products, namely, a calcium silicate slag and ferrophosphorus which are discharged from the bottom of the furnace. The gaseous mixture is passed through an electrostatic precipitator which removes most of the solid particles and then is introduced into a condenser where it is contacted with an aqueous solution of an alkali metal compound such as sodium hydroxide, sodium carbonate or the corresponding potassium salts. This results in the production of fluosilicates of the above metals by a series of reactions which may be represented by the following equations:

$$3SiF_4 + 4H_2O \rightarrow H_2SiF_6 + H_4SiO_4$$

$$H_2SiF_6 + 2MOH \rightarrow M_2SiF_6 + 2H_2O$$

$$H_2SiF_6 + M_2CO_3 \rightarrow M_2SiF_6 + CO_2 + H_2O$$

wherein M stands for an alkali metal.

The aqueous solution of alkali metal fluosilicate, sludge and elemental phosphorus thus obtained is withdrawn from the condenser and allowed to separate into layers. The layers of solution, sludge and phosphorus are separated and the above solution, after being fortified with the above alkali metal compounds, is returned to the condenser for the purpose of condensing additional quantities of phosphorus. In addition to condensing the phosphorus, this operation performs the important function of substantially reducing the fluorine content of the gaseous mixture, and also of converting the acid components of the mixture into their corresponding salts which are less corrosive to the metal of the condenser system.

The uncondensed gas consisting mainly of carbon monoxide is withdrawn from the condenser and used as fuel or any other desirable purpose.

The above-described method of treating the gaseous mixture produced in the manufacture of elemental phosphorus has enjoyed a large measure of success, but unfortunately it has a number of disadvantages.

For example, when practicing the above method a scale of alkali metal fluosilicate is formed in the condenser, the pump lines and spray headers, which at times breaks off in lumps and blocks the sprays. In fact, scaling becomes such a problem, particularly when using Florida rock as a component of the furnace charge, that in order to obviate the above difficulties it is necessary to substantially reduce normal phosphorus production or to practically double the amount of water introduced into the condenser. The former is objectionable for obvious reasons and the latter necessitates an appreciable capital cost in order to provide for the installation of additional water disposal equipment. Moreover, failure to adopt either of the above expedients results in frequent plant shut-downs and excessively high maintenance costs on pumps, piping and sprays to say nothing of increased labor costs.

Now I have developed an economically and commercially feasible method of solving the above-described problem of scale formation which has none of the disadvantages enumerated above. In accordance with this method, the hot gaseous mixture from the phosphorus furnace is treated in an electrostatic precipitator or another suitable dust separator to eliminate the finely divided solid particles. The mixture so treated is introduced into a condenser and sprayed with an ammoniated solution to yield a gaseous residue which is exhausted from the condenser and a liquid product which separates into three layers, namely, a bottom phosphorus layer, an intermediate sludge layer and a top layer of ammoniated solution containing ammonium fluoride.

The ammoniated solution containing ammonium fluoride is treated with ammonia gas, prior to or after separation from the other two layers, to increase its pH to about 5 to about 7 and preferably to about 6 and then recycled to the condenser to remove phosphorus, phosphorus oxides and fluorine containing compounds from the incoming gases.

In general, it is desirable to maintain the pH of the ammoniated solution within the limits of about 5 to about 7 since there is a tendency for excessive corrosion to occur at a pH below 5 and a pH above 7 results in a needless waste of ammonia. However, it is to be understood that the invention, in its broadest aspects, contemplates the use of an ammoniated or ammoniacal solution having a pH outside of the above limits.

The gaseous ammonia used for the above operation is preferably stored as a liquid under pressure and when the pH of the water in the condenser falls below the predetermined value, a valve controlled line is opened and ammonia gas is drawn from a suitable storage tank and fed into the condenser under its own pressure.

The sludge and phosphorus layers are separated from each other, the former being discharged from the system and the latter being conveyed to suitable storage tanks.

For a more complete understanding of the present invention, reference is made to the following illustrative example.

The gaseous mixture from an electrical phosphorus furnace was passed through an electrostatic precipitator to separate the finely divided solid impurities, whereupon the mixture was introduced into a condenser and sprayed at a temperature of about 60° C. with an aqueous ammoniated solution having a pH in 1% solution of about 6. This resulted in the production of a dispersion of both elemental phosphorus and a relatively small amount of sludge in a dilute solution of ammonium fluoride which was formed by the reaction of the ammonia with the hydrogen fluoride content of the gaseous mixture and/or with water and the the silicon tetrafluoride content of the gaseous mixture. The dispersion thus obtained was withdrawn from the condenser and allowed to stratify in the condenser sump into three layers, namely, a top aqueous solution of ammonium fluoride, an intermediate colloidal sludge layer including hydrated silica and solid impurities and a bottom phosphorus layer.

The aqueous solution of ammonium fluoride was cooled to about 50° C., treated with gaseous ammonia to raise its pH to about 6 and then continuously recycled and sprayed into the condenser for the purpose of continuously removing the above-mentioned materials from the incoming gases.

The sludge layer was separated from the phosphorus layer and then discharged from the system, and the latter was conveyed to a suitable storage tank.

The uncondensed gases were discharged from the system and conveyed to various points in the plant to be used as fuel.

By the adoption of the above technique, the problem of scaling has been solved without reducing the normal phosphorus production and without using water in excess of that required by the prior art methods.

Moreover, the use of the above technique has resulted in a reduction of maintenance costs on items affected by scaling by about fifty percent. In addition, aside from maintenance costs, labor and operating costs have been substantially reduced by eliminating the handling, mixing and pumping of the alkali metal compounds used by the prior art methods.

It is to be understood that the foregoing example is illustrative and by no means limits the scope of the invention. The invention may be incorporated in various other embodiments than that disclosed as the preferred embodiment, as signified by the scope of the appended claims.

What I claim is:

1. The method of continuously separating phosphorus from a hot gaseous mixture containing carbon monoxide, elemental phosphorus vapor, phosphorus oxides, hydrogen fluoride and silicon tetrafluoride which comprises continuously contacting said mixture with an aqueous solution of ammonium salts, said aqueous solution having a temperature below the condensation temperature of said phosphorus vapor and having a predetermined pH between about 5 and about 7, to form a liquid product comprising a dispersion of both elemental phosphorus and a relatively small amount of sludge in a dilute aqueous solution of ammonium salts, continuously raising the pH of said liquid product to said predetermined value by adding ammonia thereto, continuously separating said liquid product into a top layer comprising an aqueous solution of ammonium salts, an intermediate sludge layer and a bottom layer containing condensed phosphorus, continuously separating said aqueous layer of ammonium salts from said other layers, continuously cooling the separated aqueous solution to the above-mentioned temperature, and continuously recycling the cooled aqueous solution to the said contacting of the above-described hot gaseous mixture with the said aqueous solution of ammonium salts, said hot gaseous mixture being derived from a phosphate reduction furnace.

2. The method of continuously separating phosphorus from a hot gaseous mixture containing carbon monoxide, elemental phosphorus vapor, phosphorus oxides, hydrogen fluoride and silicon tetrafluoride, which comprises continuously contacting said mixture with an aqueous solution of ammonium salts, said aqueous solution having a temperature below the condensation temperature of said phosphorus vapor and having a predetermined pH between about 5 and about 7, to form a liquid product containing condensed phosphorus, sludge and a solution of ammonium salts, continuously separating said liquid product into a top layer comprising an aqueous solution of ammonium salts, an intermediate sludge layer and a bottom layer containing condensed phosphorus, continuously raising the pH of said aqueous layer of ammonium salts to said predetermined value by adding ammonia thereto, continuously cooling the resulting aqueous solution to the above-mentioned temperature and continuously recycling the cooled aqueous solution to the said contacting of the above-described hot gaseous mixture with the said aqueous solution of ammonium salts, said hot gaseous mixture being derived from a phosphate reduction furnace.

3. The method of continuously separating phosphorus from a hot gaseous mixture containing carbon monoxide, elemental phosphorus vapor, phosphorus oxides, hydrogen fluoride and silicon tetrafluoride, which comprises continuously contacting said mixture with an aqueous solution of ammonium salts, said solution having a temperature below the condensation temperature of said phosphorus and a pH of about 6, to form a liquid product containing condensed phosphorus, sludge and a solution of ammonium salts, continuously separating said liquid product into a top layer comprising an aqueous solution of ammonium salts, an intermediate sludge layer and a bottom layer containing condensed phosphorus, continuously separating said top aqueous layer of ammonium salts from said other layers, continuously cooling the aqueous solution of ammonium salts thus separated to the above-mentioned temperature, continuously raising the pH of said cooled aqueous solution to a value of about 6 by adding ammonia thereto and continuously recycling the resulting product to the said contacting of the above-described hot gaseous mixture with the said aqueous solution of ammonium salts, said hot gaseous mixture being derived from a phosphate reduction furnace.

4. The method of continuously separating phosphorus from a hot gaseous mixture containing carbon monoxide, elemental phosphorus vapor, phosphorus oxides, hydrogen fluoride and silicon tetrafluoride, which comprises continuously contacting said gaseous mixture with an aqueous solution of ammonium salts, said solution having a temperature of about 60° C. and a pH of about 6, to form a liquid product containing condensed phosphorus, sludge and an aqueous solution of ammonium salts, continuously separating said liquid product into a top layer comprising an aqueous solution of ammonium salts, an intermediate sludge layer and a bottom layer containing condensed phosphorus, continuously separating said aqueous top layer of ammonium salts from said other layers, continuously cooling the aqueous solution of ammonium salts thus separated to the above-mentioned temperature, continuously raising the pH of said cooled aqueous solution to the above-mentioned value by adding ammonia thereto, and continuously recycling the resulting product to the said contacting of the above-described hot gaseous mixture with the said aqueous solution of ammonium salts, said hot gaseous mixture being derived from a phosphate reduction furnace.

5. In the method of continuously separating phosphorus from a hot gaseous mixture containing carbon monoxide, elemental phosphorus vapor, phosphorus oxides, hydrogen fluoride and silicon tetrafluoride by continuously scrubbing said mixture with an aqueous solution containing ammonium fluoride, said solution having a temperature below the condensation temperature of said phosphorus vapor and having a predetermined pH between about 5 to about 7, to form a liquid product comprising a bottom phosphorus layer, an intermediate sludge layer and a top layer comprising an aqueous solution of ammonium fluoride, continuously separating said aqueous layer of ammonium fluoride from said other layers, continuously cooling the separated aqueous solution to the above-mentioned temperature, and continuously recycling the cooled aqueous solution to said scrubbing step to effect a separation of further quantities of phosphorus, the improvement which comprises continuously raising the pH of said aqueous solution, prior to cooling and recycling same, to said predetermined value by adding ammonia thereto, said hot gaseous mixture being derived from a phosphate reduction furnace.

6. In the method of continuously separating phosphorus from a hot gaseous mixture containing carbon monoxide, phosphorus vapor, phosphorus oxides, hydrogen fluoride and silicon tetrafluoride by continuously scrubbing said mixture with an aqueous solution containing ammonium fluoride, said solution having a temperature below the condensation temperature of said phosphorus and having a pH of about 6, to form a liquid product comprising a bottom phosphorus layer, an intermediate sludge layer and a top layer comprising an aqueous solution of ammonium fluoride, continuously separating said aqueous layer of ammonium fluoride from said other layers, continuously cooling the separated aqueous solution to the above-mentioned temperature, and continuously recycling the cooled aqueous solution to said scrubbing step to effect a separation of further quantities of phosphorus, the improvement which comprises continuously raising the pH of said recycled solution to about 6 by adding ammonia thereto, said hot gaseous mixture being derived from a phosphate reduction furnace.

7. In the method of continuously separating phosphorus from a hot gaseous mixture containing carbon monoxide, phosphorus vapor, phosphorus oxides, hydrogen fluoride and silicon tetrafluoride by spraying said gaseous mixture with an aqueous solution containing ammonium fluoride, said solution having a temperature below the condensation temperature of said phosphorus vapor, and having a pH of about 6, to form a liquid product comprising a bottom phosphorus layer, an intermediate sludge layer and a top layer comprising an aqueous solution of ammonium fluoride, continuously separating said aqueous layer of ammonium fluoride from said other layers, continuously cooling the separated aqueous solution to the above-mentioned temperature, and continuously recycling the cooled aqueous solution to said spraying step to effect a further separation of phosphorus, the improvement which comprises continuously raising the pH of said recycled solution to about 6 by adding ammonia thereto, said hot gaseous mixture being derived from a phosphate reduction furnace.

References Cited in the file of this patent

UNITED STATES PATENTS

| | | |
|---|---|---|
| 1,659,198 | Griessbach | Feb. 14, 1928 |
| 1,777,582 | Seyfried | Oct. 7, 1930 |
| 1,788,838 | Lang | Jan. 13, 1931 |
| 1,896,006 | Memminger | Jan. 31, 1933 |
| 1,951,984 | Kerschbaum | Mar. 20, 1934 |
| 1,984,674 | Fiske | Dec. 18, 1934 |
| 2,039,297 | Curtis | May 5, 1936 |
| 2,050,796 | Kerschbaum | Aug. 11, 1936 |
| 2,062,091 | Gooch | Nov. 24, 1936 |
| 2,561,415 | Rice | July 24, 1951 |

UNITED STATES PATENT OFFICE

CERTIFICATE OF CORRECTION

Patent No. 2,796,333                         June 18, 1957

William W. Wade

It is hereby certified that error appears in the printed specification of the above numbered patent requiring correction and that the said Letters Patent should read as corrected below.

Column 1, line 67, for "such as a" read --such a--; column 2, line 30, for "ammoniated" read --ammoniacal--.

Signed and sealed this 24th day of September 1957.

(SEAL)
Attest:
KARL H. AXLINE

Attesting Officer

ROBERT C. WATSON
Commissioner of Patents